United States Patent Office 3,183,211
Patented May 11, 1965

3,183,211
STABILIZED POLYOXYMETHYLENE
Keith Clark Brinker and Carl Earle Schweitzer, Wilmington, Del., assignors to E. I. du Pont de Nemours and Company, Wilmington, Del., a corporation of Delaware
No Drawing. Filed July 14, 1961, Ser. No. 124,021
8 Claims. (Cl. 260—67)

This invention relates to a novel process for preparing stable polyoxymethylene and, more particularly, it relates to the stabilization of polyoxymethylene having a number average molecular weight of at least 10,000 by reacting the polyoxymethylene with an alkylene oxide to obtain a polyoxymethylene having a number average molecular weight of at least 10,000 and a reaction rate constant for thermal degradation at 222° C. of less than about 1% by weight per minute.

In United States Patent 2,964,500, issued December 13, 1960, to S. H. Jenkins et al., there is described a process for the esterification of high molecular formaldehyde polymers to improve the thermal stability. Although the stability of the polyoxymethylene is improved by the treatment of the aforementioned patent, the product is not sufficiently base stable to permit its employment in extremely basic medium. Copending application Serial No. 785,136, filed on January 6, 1959, by Northrop Brown et al. discloses a process for the preparation of polyoxymethylene ethers to provide a base stable polyoxymethylene.

It has now been discovered that base stable polyoxymethylene may be prepared by reacting the unstabilized polymer with an alkylene oxide, and accordingly, it is an object of this invention to provide a polyoxymethylene stabilized with an alkylene oxide and a process for preparing such stabilized material. Other objects will appear hereinafter.

The above objects are accomplished by reacting a polyoxymethylene with an alkylene, e.g. ethylene, propylene, isobutylene, etc., oxide represented by the general formula

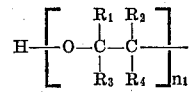

wherein $R_1$, $R_2$, $R_3$ and $R_4$ are selected from the groups consisting of hydrogen, alkyl groups of 1-20 carbon atoms, aryl groups of 6-10 carbon atoms, aryl alkyls of 7-20 carbon atoms, and combinations thereof in the presence of an acidic catalyst to provide a mildly acidic reaction medium and thereafter recovering a thermally stable polyoxymethylene having improved base stability and the reaction rate constant for thermal degradation at 222° C. of less than 1% by weight per minute. More particularly, the above objects are accomplished by reacting one part by weight of polyoxymethylene starting material preferably having a hydroxyl group for at least one of the two terminal portions of the polymer chain and having a number average molecular weight of at least 10,000 with 0.05 to 100 parts by weight of an alkylene oxide having the above-mentioned formula in the presence of 0.0025 to 5.0% parts by weight based upon the polymer of an acid, and preferably, a Friedel-Crafts metal halide type of Lewis Acid, and thereafter recovering a polyoxymethylene having a number average molecular weight of at least 10,000.

The polyoxymethylene starting material employed in the process of this invention is a polymer of recurring oxymethylene units (—CH₂O—) or a polymer containing a predominance of the aforemntioned group with the chain of the polymer normally terminated at each end by a hydroxyl group, an ether group, or an ester group. This process requires that at least one of the two terminal groups of the starting polymer be a hydroxyl group, which, in turn, is reacted with the alkylene oxide to produce the final product. Polymers which already contain ether linkages on the ends of the polymer chain are base stable and do not normally require treatment of the process of the present invention.

The product of the present invention is believed to have the general formula $X$—O—$(CH_2O)_n$—$Y$ where $X$ is a member of a class consisting of the groups having the formula

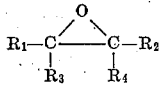

and alkyl groups of 1-10 carbon atoms, Y is a group having the formula

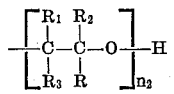

$n$ is a positive integer greater than 300, $n_1$ and $n_2$ are positive integers of 1-20, and preferably 1-10, and $R_1$, $R_2$, $R_3$, and $R_4$ are members selected from the class consisting of hydrogen, alkyl groups of 1-20 carbon atoms, aryl groups of 6-10 carbon atoms, and arylalkyl groups of 7-20 carbon atoms. The product has a reaction rate constant for thermal degradation of less than 1% by weight per minute at 222° C. The reaction rate constant for thermal degradation which is calculated from the equation given below, and reported as $k_{222}$, has units of weight percent of the polymer which degrades per minute.

$k_{222}$ (percent/min.) =

$$\frac{(\text{volume of gas in cc. evolved in time } t)\ (0.0736)}{(\text{time } t \text{ in minutes})\ (\text{initial weight of polymer sample in grams})}$$

The factor 0.0736 is a constant which is calculated on the assumption that the evolved gas is formaldehyde and that it behaves as an ideal gas. A preferred method for determining the volume of gas evolved which in turn may be used in the above equation, is to place a small weighed sample of polymer which is to be tested in a hypodermic syringe of about 50 cc. in volume. The syringe containing the polymer is then placed in a vapor bath at a temperature of 222° C., which may be obtained by utilizing the vapors of methyl salicylate which boils at 222° C. and recording the volume of vapor which is evolved in the period between 10 and 20 mins. residence time in the vapor bath. In the preferred operation of this test, polymer in the form of a small, pressed pellet is weighed to the nearest 0.01 gram and placed in a well-cleaned syringe which is sealed between the plunger and cylinder with a high quantity lubricating fluid such as silicone oil. In order to remove oxygen and eliminate the effects of oxidative degradation, the syringe is flushed with nitrogen several times, following which the lubricating fluid is drawn into the syringe, causing the nitrogen to be displaced and leaving the polymer pellet immersed in a small quantity of lubricating fluid. The nozzle of the syringe is then sealed, the syringe is suspended in a bath of methyl salicylate vapors, and the volume of the composition vapors evolved is recorded by noting the position of the syringe cylinders at 10 and 20 minutes after placing the syringe in the bath. If the gas evolution is plotted against time throughout the period of heating, it may be observed that the shape of the curve, although not conforming strictly to that predicted by first order kinetics, generally follows a first order reaction. It should also be observed that the initial evolution of gas may be somewhat higher than that during the major portion of the test, however, following the procedure set forth hereinabove, good reproducible results may be obtained for measuring the thermal stability of the stabilized polymer.

Some examples of the acids or acid reacting compounds that may be used as catalysts within the scope of this invention to provide a mildly acidic reaction medium include Lewis Acids usually of the Friedel-Crafts type such as aluminum trichloride, aluminum tribromide aluminum triiodide, aluminum trifluoride, tin tetrafluoride, tin tetrachloride, tin tetrabromide, tin tetraiodide, ferric chloride, ferric bromide, ferric fluoride, ferrous fluoride, ferrous bromide, ferrous chloride, titanium tetrachloride, titanium tetrabromide, zinc bromide, zinc fluoride, zinc chloride, boron trifluoride, boron trichloride, antimonytrichloride, antimonytrifluoride, antimonytribromide, antimonytriiodide, antimonypentachloride, antimonypentafluoride, lead dibromide, lead difluoride, cobalt dibromide, cobalt chloride, and cobalt fluoride, protonic or Bronsted acids with a pK of less than 5.5, including organic carboxylic acids such as adipic acid, formic acid and glutaric acid, sulfonic acids such as paratoluene sulfonic, inorganic acids such as sulfuric, hydrochloric and phosphoric acids and the like; and phenols having a pK greater than 5.5. The salts of strong acids (pK less than 2.0) with weak bases may also be used. The acid catalyst should be compatible with the stabilizing reagent i.e., should not form insoluble complexes with the reagent in the case of the slurry or solution process and should not form nonvolatile complexes in the case of the vapor phase process. Strong acids and acids which are strong oxidizing or reducing agents should be used sparingly to prevent excessive degradation of the unreacted polymer by causing the reaction medium to be more than mildly acidic. Excessive degradation may also be avoided by adding these acids in such a manner that the contact time of the acid with the unreacted polymer is held at a minimum. The preferred range of concentration of acid catalysts, excluding phenol and the Lewis Acids, is from 0.01–5% by weight of the reaction medium excluding the polymer therein. The same range is preferred for their salts with weak bases. The preferred range of concentration of phenol is from 5–90% by weight of the reaction medium exclusive of the polymer therein. The preferred range of concentration of the Lewis Acids is 0.001–0.5% by weight of the reaction medium exclusive of the polymer. Generally, aluminum trichloride, tin tetrachloride, titanium tetrafluoride, and boron trifluoride are preferred since they are commercially available. Certain complexes of the aforementioned metal halides may be operable in the present invention, and may be preferred when it is desired to employ a liquid catalyst. Such complexes which are considered in the scope of the present invention include tertiary amine complexes and ether complexes; the preferred ether being diethyl ether. Specific examples of other tertiary amines which may be used in the present invention include, but are not limited to, trimethyl amine, tripropyl amine, dimethylstearylamine, dimethylcyclohexylamine, dimethylbutylamine, diethylcyclohexylamine, diethylbutylamine, and pyridine. Examples of other ethers are the dialkyl ethers, such as dimethyl ether, dibutyl ether, and dipropyl ether. The complex of the metal halide with a tertiary amine or ether may be prepared by mixing the respective materials in a suitable solvent. The catalyst complex may also be prepared by adding in a Friedel-Crafts metal halide to the ether. The resultant product which is an ether complex is more easily manipulated than some of the aforementioned gaseous metal halides.

It may be observed from the following examples that the reaction conditions for accomplishing the stabilization set forth in the present application using the alkylene oxides set forth above are not restricted, but on the contrary, offer a wide variety of conditions which may be used in the different embodiments of the invention. For instance, the examples illustrate the fact that the stabilization of polyoxymethylene can be accomplished in any compatible medium in which the polymer can be intimately contacted with the desired stabilizing reactant. The medium may be a non-degrading solvent for polyoxymethylene or it may be a non-solvent which forms a slurry with polyoxymethylene particles or the stabilizing reactant and catalyst may be in the vapor phase, while the polyoxymethylene is present as a solid. Inert gases, such as nitrogen and carbon dioxide, which are relatively pure, may be added as diluents to the vapor in the case where the stabilizing reactant and the catalyst are in the vapor phase, while the polyoxymethylene is present as a solid during the reaction. Solvents for the polyoxymethylene in a solution process may be dimethyl formamide, dixylenol butane, halogenated phenol, while non-solvents may include ethers, hydrocarbons, alkylene and alkyl halides and like compounds which are familiar to skilled chemists. Some of the solvents for the polyoxymethylene such as dimethyl formamide will also increase the solubility of the catalyst of the reaction medium and thus allow the use of catalysts which by themselves would not give a satisfactory reaction. The time of reaction may be as long as is necessary to reach completion of the reaction without decomposing too much unstabilized polymer, and with long reaction times, temperatures as low as 0° C. may be employed. Temperatures as high as 200° C. may be employed with short reaction times. The temperature, time, concentration of reactants, strength of catalyst and efficiency of the stabilization reactant must be balanced, as in most other reactions, so as to cause an acceptable amount of reaction in a reasonable time. The chains of the polymer are susceptible to attack by acids and may be cleaved by such an attack, therefore it is important to adjust the reaction temperature and time, so that the cleavage and other side reactions that take place are slow enough and yet the replacement of end groups is fast enough so that an acceptable yield is obtained. In the preferred embodiment of the process of this invention, the reaction temperature is between 120–170° C., the polyoxymethylene is in the solid phase; the preferred stabilizing agent, ethylene oxide, is present at a concentration of 0.1–10 parts per part of polyoxymethylene and in the vapor phase; and the preferred catalyst, boron trifluoride, is present at a concentration of 0.001–0.5% by weight of the reaction medium based upon the polymer and in the vapor phase. The crude, stabilized polymer may possess sufficient thermal stability to be molded without refining; however, in the preparation of molded objects which require extremely thermally stable polymers, it is desirable to remove all of the unreacted polyoxymethylene. The unreacted polyoxymethylene may be removed by dissolving the unpurified product and heating the solution in the presence of a strong amine, as in Example I, or a caustic to depolymerize unreacted polymer. Solvents which may be used in the presence of an amine include the aliphatic and aromatic hydroxy compounds, such as cyclohexanol, glycol, benzyl alcohol, and phenol, and the preferred solvents for the caustic treatment are ethers such as trioxymethylene dimethyl ether and diethylene glycol dimethyl ether. Amines and caustics which are useful in the purification step include triethyl amine, tripropyl amine, sodium hydroxide, and potassium hydroxide. Another procedure which may be employed for the removal for the unreacted polyoxymethylene is the thermal degradation of the solid or molten polymer, or of the polymer in solution, in the absence of an amine or a caustic.

The number average molecular weight of the products herein may be measured by the classical methods of osmometry although this method is cumbersome and not particularly suitable for the lower range of molecular weights. Another method for molecular weight determination is the measurement of inherent viscosity of the polymer and since this method of measurement of inherent viscosity bears a direct relationship to the number average molecular weight for each class of polyoxymethylene, this measurement is used herein to characterize the polymers. The inherent viscosity (I.V.) of this invention is measured by dissolving 0.125 gram of the polymer in 25 milliliters of reagent grade phenol which has been purified by distillation from solid caustic. The polymer is not soluble in the phenol at room temperature and usually the mixture is heated to 120° C. to increase the rate of solution of polymer. The viscosity of the phenol solvent and the viscosity of the phenol polymer solution is measured at 90° C. by noting the time required to pass the same volume of each material through an Ostwald viscometer. The inherent viscosity (I.V.) is then determined by using the following formula $$I.V. = \frac{2.303 \log \left[\frac{\text{time of solution}}{\text{time of solvent}}\right]}{\text{wt. of polymer in 100 cc. of phenol}}$$

This inherent viscosity may be correlated with the number average molecular weight of the polymer in each particular polymerization system in which correlation is made, but may be more closely correlated with weight average molecular weight for most systems.

The following examples serve to illustrate certain embodiments of this invention and are not intended to restrict the invention. Parts and percentages are based on weight unless otherwise specified. Measurements of molecular weight and of the reaction rate constant are made in the manner described hereinabove.

*Example I*

The starting material for this example was a substantially 100% crystalline polyoxymethylene having a molecular weight of approximately 20,000 as measured by methoxyl analysis and having the polymer chain terminated at one end by a hydroxyl group and at the other end by a methoxyl group. Into a dry glass flask, which had been baked at 110° C. prior to use, there were added 117 parts of cyclohexane, 10 parts of the aforementioned polymer, and 1.3 parts of boron trifluoride dimethyl etherate. A stream of dry nitrogen was passed through liquid propylene oxide at room temperature and then directed into the flask in such a manner that the nitrogen/propylene oxide vapor bubbled through the slurry. The slurry was held at room temperature for 22 hours, while the aforementioned gas stream was bubbled through the reactor at a rate of 0.1 part of propylene oxide per hour, whereupon the slurry was placed on a suitable filter and the solid recovered followed by washing of the cake 3 times with 100 parts of methanol for each washing and by two washings with 100 parts of acetone. The cake was then dried at room temperature by passing air therethrough. The polymer which was recovered amounted to 78.5% of the original 10 parts. In order to remove any unreacted polymer or impurities, the above product along with 50 parts of benzyl alcohol and 2 parts of tri-n-propyl amine were added to a cylindrical glass reactor equipped with a glass frit to retain the slurry, a nitrogen inlet below the frit and an exit line for gas above the slurry. The reactor was purged thoroughly with nitrogen, then placed in a silicon oil bath, at 165° C. for 1 hour while continuing the nitrogen purge. The polymer dissolved in about ½ hour. The reactor was cooled slowly while continuing the purge to permit the dissolved polymer to precipitate. Subsequently, the mixture was filtered and washed 6 times with approximately 70 parts acetone for each washing and dried in a vacuum oven at 70° C. for 16 hours. The base stable polymer which was recovered amounted to 19.8% of the original 10 parts and had a $k_{222}$ of less than 1% by weight per minute, an I.V. in phenol at 90° C. of 0.617 and an optical melting point of 171° C.

*Example II*

The starting material for this example was a high molecular weight, linear polymer of formaldehyde which was prepared according to the general process of claim 8 of U.S. Patent 2,768,994, issued to R. N. MacDonald on October 30, 1956, using dry cyclohexane as the reaction medium with a quaternary ammonium salt as the formaldehyde polymerization initiator. This polyoxymethylene had an average molecular weight of approximately 51,000 as determined by analysis of hydroxyl end groups per thousand formaldehyde groups. The stabilization was effected by contacting the weighed amount of unstabilized polymer with a vapor stream which contained a stabilizing reactant and a catalyst. A glass vessel, which had a porous, fritted bottom, a vapor inlet below the frit, and a vapor outlet above the frit, was used as a reactor. The frit retained the polymer and acted as a distributor for the vapor stream which was passed upflow through the frit. The temperature was controlled by immersing the reactor in a controlled temperature oil bath. Approximately 3.382 grams of dry, oxygen-free polymer were charged to the reactor and the reactor was purged with nitrogen for 15 minutes and thereafter immersed in an oil-bath at 143° C. whereupon a vapor stream containing 0.2 part ethylene oxide, 0.13 part of nitrogen, and 0.003 part of boron trifluoride was passed upflow through the reactor for 20 minutes, following which the reactor was sparged with dry nitrogen for 5 minutes. The bath was cooled to room temperature with nitrogen purge continuing through the reactor. The product was then removed from the reactor, washed 5 times with 50 parts of acetone and air-dried to obtain the weight of the crude stabilized polymer which amounted to 95.6% of the material charged. The crude stabilized material was then refined by the amine treatment of Example I and 21.3% was recovered. This refined polymer exhibited excellent base stability and possessed the reaction rate constant for thermal degradation of less than 1% by weight per minute.

*Example III*

In this example the polymer was subjected to substantially the same stabilization conditions as set forth in Example II with a somewhat modified apparatus, which comprised a stainless steel, steam-jacketed pipe, 3 inches in diameter which was mounted vertically and which was equipped with a gas distributor plate in the lower portions of the pipe, a vapor inlet below the plate and vapor exit above the plate. After approximately 2180 parts of unstablized polymer similar to that used as the starting material in Example II which had a molecular weight of approximately 51,000 was charged to the aforementioned reactor, nitrogen was passed up-flow therethrough. This initial nitrogen purge was followed by a stream containing 12 parts of ethylene oxide, 24 parts of nitrogen, and 0.15 part of boron trifluoride for a period of approximately 68 minutes. The vapor stream was preheated to a temperature of about 150° C. and the gas flow maintained the polymer in a fluidized state. Simultaneously, with the application of the vapor stream, steam was applied to the reactor jacket and held at about 72 pounds/square inch, resulting in a polymer temperature varying from the initial portion of the stabilization at 129° C. to 144° C. at the end of the stabilization period, whereupon the reactor was purged with nitrogen for 20 minutes and 51% of the polymer originally charged was recivered as crude stabilized material. The temperature observed within the reactor in view of the temperature of the gas stream and the temperature of the jacket is believed to have been caused by side reaction which degraded the polyoxymethylene as the capping was continued. Approximately 86.45% of the crude stabilized polymer was recovered after the amine treatment of Example I. The refined polymer had an excellent color, excellent base and thermal stability, and possessed molecular weight on the order of 26,000.

*Example IV*

In this example, 2180 parts of the polymer of Example III were treated in substantially the same apparatus as Example III employing propylene oxide as the stabilizing reactant. It was necessary to vaporize the propylene oxide before mixing the oxide with nitrogen and boron trifluoride to obtain a stream having a composition of 24 parts of propylene oxide, 20 parts of nitrogen and 0.06 part of boron trifluoride which was passed through the reactor for 40 minutes after a 10 minute sparge of nitrogen prior to introduction of the stabilizing vapor. The temperature profile was substantially the same as shown in Example III. The crude stabilized polymer was recovered as set forth in Example III and amounted to 91.5% of the original charge. After suitable refining by the amine treatment set forth in Example I, 20.88% of the crude stabilized polymer was recovered which possessed excellent color, good stability having a $k_{222}$ of less than 1% by weight per minute and having a molecular weight of 26,000.

The term polyoxymethylene as employed herein refers to a polymer chain having recurring acetal linkages formed by carbon atoms and oxygen atoms as the predominant portion of the chain. Such polymers may be prepared by way of several processes for the polymerization of formaldehyde, trioxane or other low polymers of formaldehyde. These polymers and process for their production are described and claimed in many U.S. patents, for example:

U.S. 2,734,889, issued February 14, 1956, to F. C. Starr, Jr.,
U.S. 2,768,994, issued October 30, 1956, to R. N. MacDonald,
U.S. 2,828,286, issued March 25, 1958, to R. N. MacDonald,
U.S. 2,844,561, issued July 22, 1958, to M. F. Bechtold et al.,
U.S. 2,848,437, issued August 19, 1958, to W. P. Langsdorf et al.,
U.S. 2,841,570, issued July 1, 1958, to R. N. MacDonald and in copending application Serial No. 785,135, filed January 6, 1959, by H. H. Goodman et al., now Patent No. 2,994,687.

A variety of polyoxymethylene, i.e. polyoxymethylene dicarboxylates, may be prepared by the processes described and claimed in copending applications S.N. 681,188, filed August 30, 1957, by S. Dal Nogare et al., now Patent No. 2,998,409, and
S.N. 763,842, filed Sept. 29, 1958, by S. H. Jenkins et al., now Patent No. 2,964,500.

Polyoxymethylene diethers may be prepared by the processes described and claimed in U.S. copending applications S.N. 682,325, filed Sept. 6, 1957, by N. Brown et al., and
S.N. 785,136, filed January 6, 1959, by N. Brown et al.

Included in the generic term polyoxymethylene are copolymers such as those prepared by the techniques set forth in U.S. Patent 2,828,287, issued March 25, 1958, to Theodore L. Cairns et al. and in copending applications S.N. 35,419 filed June 13, 1960, by N. Brown et al., now Patent No. 3,076,786,
S.N. 35,420, filed June 13, 1960, by N. Brown et al.,
S.N. 35,421, filed June 13, 1960, by E. T. Cline et al., now abandoned,
S.N. 51,294, filed August 23, 1960, by E. T. Cline et al., and
S.N. 91,318, filed February 24, 1961, by E. T. Cline.

The polymers of this invention find widespread utility in the production of films by pressing or extrusion, spinning of fibers, filaments, or bristle material, and in injection molding of gears and like items. The composition of this invention has remarkable thermal stability and excellent resistance to degradation in basic media as shown in the foregoing examples.

We claim:
1. A thermally stable polyoxymethylene having improved base stability and having the formula

$$X-O-CH_2O_n-Y$$

where X is a member of a class consisting of the groups having the formula

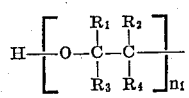

and alkyl groups of 1–10 carbon atoms, Y is a group having the formula

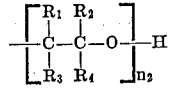

$n$ is a positive integer greater than 300, $n_1$ and $n_2$ are positive integers of 1–20 and $R_1$, $R_2$, $R_3$, and $R_4$ are members selected from the class consisting of hydrogen, alkyl groups of 1–20 carbon atoms, aryl groups of 6–10 carbon atoms and arylalkyl groups of 7–20 carbon atoms, and having a reaction rate constant for thermal degradation of less than 1% by weight per minute at 222° C.

2. A thermally stable polyoxymethylene having improved base stability and having the formula $$X-O-CH_2O_n-Y$$

where X is a member of the class consisting of groups having the formula

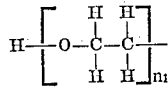

and alkyl groups of 1–10 carbon atoms. Y is a group having the formula

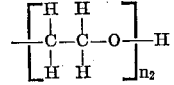

$n$ is a positive integer greater than 300, and $n_1$ and $n_2$ are positive integers of 1–10 and having a reaction rate constant for thermal degradation of less than 1% by weight per minute.

3. A thermally stable polyoxymethylene having improved base stability and having the formula $$X-O-CH_2O_n-Y$$

where X is a member of the class consisting of groups having the formula

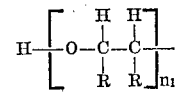

and alkyl groups of 1–10 carbon atoms, Y is a group having the formula

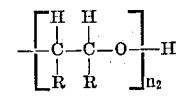

$n$ is a positive integer greater than 300, and $n_1$ and $n_2$ are positive integers of 1–10 and R is a group selected from the class consisting of hydrogen and methyl, wherein at least one R is a methyl group, and having a reaction rate constant for thermal degradation of less than 1% by weight per minute.

4. A process for stabilizing a polyoxymethylene which comprises reacting in a mildly acidic reaction medium, a polyoxymethylene starting material having a number average molecular weight of at least 10,000 with a compound having the general formula

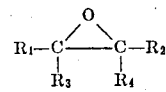

where $R_1$, $R_2$, $R_3$ and $R_4$ are groups selected from the class consisting of hydrogen, alkyl groups of 1–20 carbon atoms, aryl groups of 6–10 carbon atoms, arylalkyl groups of 7–20 carbon atoms, and combinations thereof and recovering a polyoxymethylene having improved thermal stability and a number average molecular weight of at least 10,000.

5. A process for the preparation of a thermally stable polyoxymethylene having improved base stability which comprises reacting 1 part by weight of a polyoxymethylene starting material having 1–2 of its terminal valences satisfied with a hydroxyl group and having a number average molecular weight of at least 10,000 with 0.05–100 parts of an alkylene oxide having the formula

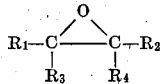

where $R_1$, $R_2$, $R_3$, and $R_4$ are groups selected from the class consisting of hydrogen, alkyl groups of 1–20 carbon atoms, aryl groups of 6–10 carbon atoms, arylalkyl groups of 7–20 carbon atoms, and combinations thereof and recovering a polyoxymethylene having improved thermal stability and a number average molecular weight of at least 10,000 at a temperature of 0°–200° C. in an acidic reaction medium and thereafter recovering a polyoxymethylene having a number average molecular weight of at least 10,000 and a reaction rate constant for thermal degradation at 222° C. of less than 1% by weight per minute.

6. The process of claim 5 wherein said alkylene oxide is ethylene oxide.

7. The process of claim 5 wherein said alkylene oxide is propylene oxide.

8. A process for the preparation of a thermally stable polyoxymethylene having improved base stability which comprises reacting 1 part by weight of a polymer having a predominance of oxymethylene chains as the main portion of the polymer chain and having 1–2 of its terminal valences satisfied with a hydroxyl group with 0.05–100 parts of ethylene oxide in the presence of 0.001–0.5 part of boron trifluoride at a temperature of 0°–200° C. and thereafter recovering a polyoxymethylene having a number average molecular weight of at least 10,000, and having a reaction rate constant for thermal degradation at 222° C. of less than 1% by weight per minute.

References Cited by the Examiner

UNITED STATES PATENTS 3,027,352  3/62  Walling et al. _____ 260—67

WILLIAM H. SHORT, *Primary Examiner.*

H. N. BURSTEIN, *Examiner.*

UNITED STATES PATENT OFFICE
CERTIFICATE OF CORRECTION

Patent No. 3,183,211                                 May 11, 1965

Keith Clark Brinker et al.

It is hereby certified that error appears in the above numbered patent requiring correction and that the said Letters Patent should read as corrected below.

Column 1, line 67, for "aforemntioned" read -- aforementioned --; column 2, lines 14 to 18, for that portion of the formula reading

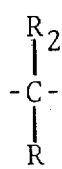        read        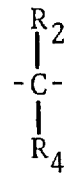

same column 2, line 51, for "quantity" read -- quality --; column 3, line 5, after "tribromide" insert a comma; column 6, line 61, for "recivered" read -- recovered --; line 65, for "polyoxmethylene" read -- polyoxymethylene --; column 8, lines 5, 27 and 47, the formula, each occurrence, should appear as shown below instead of as in the patent:

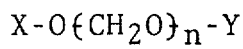

Signed and sealed this 29th day of March 1966.

(SEAL)
Attest:

ERNEST W. SWIDER                      EDWARD J. BRENNER
Attesting Officer                  Commissioner of Patents